(12) United States Patent
Heller et al.

(10) Patent No.: US 9,586,243 B2
(45) Date of Patent: Mar. 7, 2017

(54) SELF-REGENERATING BIOCATALYTIC AND/OR ANTI-ICING SURFACES

(75) Inventors: Christoph Heller, Taufkirchen (DE); Ulrich Reidt, Schwalmstadt (DE); Alois Friedberger, Oberpframmern (DE); Karin Bauer, Oberhaching (DE)

(73) Assignee: AIRBUS OPERATIONS LIMITED, Bristol (GB)

( * ) Notice: Subject to any disclaimer, the term of this patent is extended or adjusted under 35 U.S.C. 154(b) by 866 days.

(21) Appl. No.: 13/318,670

(22) PCT Filed: Apr. 28, 2010

(86) PCT No.: PCT/EP2010/055748
§ 371 (c)(1),
(2), (4) Date: Nov. 3, 2011

(87) PCT Pub. No.: WO2010/127981
PCT Pub. Date: Nov. 11, 2010

(65) Prior Publication Data
US 2012/0052251 A1    Mar. 1, 2012

(30) Foreign Application Priority Data
May 4, 2009    (EP) .................................... 09159332

(51) Int. Cl.
*B32B 17/06* (2006.01)
*B08B 17/06* (2006.01)

(52) U.S. Cl.
CPC .............. *B08B 17/06* (2013.01); *F03D 80/40* (2016.05); *F05B 2230/90* (2013.01);
(Continued)

(58) Field of Classification Search
USPC ...................... 428/172, 183, 323, 315.5, 704
See application file for complete search history.

(56) References Cited

U.S. PATENT DOCUMENTS

| | | | |
|---|---|---|---|
| 2006/0154069 A1* | 7/2006 | Lin et al. ....................... | 428/402 |
| 2007/0026193 A1* | 2/2007 | Luzinov et al. .............. | 428/141 |
| 2010/0210745 A1* | 8/2010 | McDaniel et al. ............. | 521/55 |

FOREIGN PATENT DOCUMENTS

| | | |
|---|---|---|
| DE | 10 2006 005614 | 8/2007 |
| EP | 0 903 389 | 3/1999 |
| EP | 1 249 476 | 10/2002 |

OTHER PUBLICATIONS

Stevens, K et al., Nanofibers and nanotechnology in textiles, Woodhead Publishing Limited, 2007, pp. 435-436.*

(Continued)

*Primary Examiner* — Maria Veronica Ewald
*Assistant Examiner* — Brian Handville
(74) *Attorney, Agent, or Firm* — Nixon & Vanderhye P.C.

(57) ABSTRACT

The invention relates to a self-cleaning self-regenerating surface structure and/or a self-cleaning self-regenerating coating. For improving the cleaning function, the invention proposes a self-regenerating surface structure, especially coating, comprising biocatalytic and/or anti-icing molecules on an exposed surface of said surface structure, especially coating, and biocatalytic and/or anti-icing molecules embedded or contained in said surface structure, especially coating. Further, the invention relates to an object provided with such surface structure or coating and a method for producing the same.

21 Claims, 3 Drawing Sheets

(52) U.S. Cl.
CPC ........... *Y02E 10/722* (2013.01); *Y02P 70/523* (2015.11); *Y10T 428/24612* (2015.01); *Y10T 428/249978* (2015.04); *Y10T 428/25* (2015.01)

(56) References Cited

OTHER PUBLICATIONS

International Search Report for PCT/EP2010/055748, mailed Oct. 21, 2010.
Written Opinion of the International Searching Authority for PCT/EP2010/055748, mailed Oct. 21, 2010.
Partial EP Search Report for EP Application No. 09159332, dated Oct. 23, 2009.

\* cited by examiner

SELF-REGENERATING BIOCATALYTIC AND/OR ANTI-ICING SURFACES

This application is the U.S. national phase of International Application No. PCT/EP2010/055748, filed 28 Apr. 2010, which designated the U.S. and claims priority to EP Application No. 09159332.7, filed 4 May 2009, the entire contents of each of which are hereby incorporated by reference.

The invention relates to a self-cleaning, self-regenerating surface structure, especially a self-cleaning, self-regenerating coating, an object provided or coated therewith, and a method for providing such surface structure or coating.

In the prior art, there are several teachings to provide "easy to clean" or self-cleaning surfaces. It is, for example, known from U.S. Pat. No. 6,660,363, US 2004/0213904 or US 2002/0016433, to provide artificial surface structures to objects which provide a self cleaning effect to the surfaces of the object.

U.S. Pat. No. 7,211,313 B2 discloses surfaces rendered self-cleaning by hydrophobic structures and a process for their production. The hydrophobic effect is achieved by elevations and depressions formed by particles secured to the surface by means of a carrier. It is proposed to use a mixture of particles and binder to form the carrier. Thus, particles are also present in deeper regions or layer of a surface coating. When particles on the surface are ablated by erosion, new particles in the carrier are exposed to regenerate the self-cleaning surface. The particles are made from silicates, doped silicates, minerals, metal oxides, silica, polymers and silica-coated metal powders. Thus, U.S. Pat. No. 7,211,313 B2 discloses self-regenerating self-cleaning surfaces. However, the self-regeneration is limited to special hydrophobic self-cleaning coatings.

The main disadvantage of the known surface structures is that no active degradation of organic material is provided. Furthermore, the adherence of ice is only reduced, however, can not be avoided to a larger extent.

It is an object of the invention to provide an improved self-cleaning self-regenerating surface.

This and further objects are achieved by the subject-matter of the independent claims. Advantageous embodiments form the subject-matter of the dependent claims.

The invention provides a self-regenerating surface structure comprising biocatalytic and/or anti-icing molecules on an exposed surface of said surface structure and biocatalytic and/or anti-icing molecules embedded in said surface structure. Preferably, the surface structure is or has a coating, wherein the coating comprises biocatalytic and/or anti-icing molecules on a surface of said coating and biocatalytic and/or anti-icing molecules embedded in said coating.

The invention especially provides a self-regenerating biocatalytic surface. Biocatalytic molecules especially mean biocatalytic active molecules that are able to be active as biocatalyst. Examples for such biocatalytic active molecules are biocatalytic active proteins such as active enzymes. Comparable molecules, especially proteins, can also be active to prevent or hinder the development of ice on the surface. Further details, advantages and examples of such biocatalytic and/or anti-icing molecules as well as surface structures provided therewith and a method for producing such surface structures are disclosed in the unpublished UK patent application GB 0808350.3 filed on 9 May 2008 by AIRBUS UK LIMITED and incorporated herein by reference.

Functional structures or molecules on a surface generally loose their activity or function when the surface is eroded or when the surface and the underlying layer of material are eroded. The invention and its preferred embodiments present several approaches to ensure the functionality of the surface independently of the erosion process. The material or coating is designed such that the functionality regenerates itself when the surface is eroded.

One advantage of the invention is the conservation of a biocatalytic functionality of an exposed or released surface in spite of a surface erosion process. The invention is especially useful, for example, on aircraft structures, surfaces of wind turbines for power generation, etc.

Preferably, the biocatalytic and/or anti-icing molecules are contained in an inner layer beneath the surface.

In an embodiment of the invention, an outer layer covers at least one inner layer, wherein both the inner and the outer layers contain biocatalytic and/or anti-icing molecules.

In an embodiment of the invention, any of the layers comprise similar further functional means enabling and/or promoting biocatalytic and/or anti-icing functions.

In an embodiment of the invention, several layers of the surface structure or coating comprise reservoirs for a liquid such as water or humidity as functional means.

In an embodiment of the invention, the embedded biocatalytic and/or anti-icing molecules are of the same kind and structure as the biocatalytic and/or anti-icing molecules that are present on the surface.

In an embodiment, the biocatalytic and/or anti-icing molecules that are present on the surface are immobilized on the surface.

In an embodiment, the biocatalytic and/or anti-icing molecules that are present on the surface are covering the surface at least partially.

In an embodiment of the invention, the biocatalytic and/or anti-icing molecules that are present on the surface are immobilized on the surface via a spacer and are coating the surface at least partially.

In an embodiment of the invention, the biocatalytic and/or anti-icing molecules are biocatalytic and/or anti-icing proteins.

In an embodiment of the invention, said biocatalytic proteins are enzymes or ribozymes.

In an embodiment of the invention, said enzymes are selected from the group consisting of amylases, proteases, lipases, cellulases, nucleases, chitinases, and mixtures thereof, of natural and/or artificial origin, preferably specifically engineered proteins.

In an embodiment of the invention, the anti-icing proteins are selected from anti-freeze proteins (AFP's) of artificial or natural origin, preferably AFP's derived from fishes, insects or plants.

In an embodiment of the invention, the biocatalytic and/or anti-icing molecules are adhered to and/or contained in a carrier material.

In an embodiment of the invention, the carrier material is selected from the group consisting of:
 porous materials,
 silicates, preferably mesoporous silicates, especially MCM-41, SBA-15, FDU-5, SBA-16, FDU-23,
 zeolithe,
 carbon, preferably porous carbon,
 glass, preferably porous glass,
 a matrix material of a lacquer,
 gold, especially gold nanoparticles and/or colloidal gold,
 micro capsules, especially micro capsules made from a membrane,
 polyvinyl beads or dextran beads,
 fibre materials
 aluminium, especially porous aluminium membranes, hydro gels, and
mixtures of at least two or more of the aforementioned materials.

In an embodiment of the invention, the carrier material with adhered and/or embedded biocatalytic and/or anti-icing molecules is present in form of particles embedded in a coating matrix material.

In an embodiment of the invention, the carrier material with adhered and/or embedded biocatalytic and/or anti-icing molecules is forming the surface structure material or the coating material itself for forming or coating a surface.

In an embodiment of the invention, the surface structure or coating has inner channels and/or cavities containing the biocatalytic and/or anti-icing molecules. Especially, the biocatalytic and/or anti-icing molecules are present in a liquid contained in the inner channels and/or cavities.

In an embodiment of the invention, the coating includes a plurality of layers comprising the biocatalytic and/or anti-icing molecules. Preferably, the plurality of layers is achieved by layer-by-layer deposition In an embodiment of the invention, the coating includes tree-like or self-similar structures of the biocatalytic and/or anti-icing molecules immobilized in a certain depth of the coating.

In an embodiment of the invention, the coating includes µ-channels and/or µ-pores for a transport and/or storage of non-linked biocatalytic and/or anti-icing molecules.

In an embodiment of the invention, the coating includes fusion proteins forming the biocatalytic and or anti-icing molecules.

According to an aspect of the invention there is provided an object having a surface coated with a coating according to the invention or according to any of the aforementioned embodiments or according a combination of several embodiments.

The object can be an aircraft, such as an aeroplane or a rotorcraft.

The object can be a vehicle, such as a land, air or water vehicle. Especially, the object can be a car, a trucks or a rail car.

The object can be a rotor, such as a wind rotor, for example of a wind power generator.

The object can be a building or a construction.

The object can be a household device or housekeeping device.

The object can be furniture.

The object can be an industrial product or industrial machine.

Further, the object can be any part of one of the aforementioned items, especially a wing, a body part or a rotor blade of an aircraft.

In an embodiment, the object has an aero- or hydrodynamically active surface at least partially coated by the coating according to the invention or any or a plurality of its embodiments or at least partly provided with a surface structure according to any of the claims 1 to 6.

According to a further aspect, the invention is directed to a method for providing a surface structure or surface coating comprising biocatalytic and/or anti-icing molecules on an exposed surface of said surface structure or said coating and biocatalytic and/or anti-icing molecules embedded or contained in said surface structure/coating.

Preferably the method is conducted according to at least one of several variants I) to IV), defined by at least one of the following steps:
I) introducing of the biocatalytic and/or anti-icing molecules into an inner layer of a surface coating material;
II) increasing a density of biocatalytic and/or anti-icing molecules in a coating material and/or providing a tree-like or self-similar structure of the biocatalytic and/or anti-icing molecules within a surface coating material;
III) introducing micro-channels and/or micro-pores for transport and/or storage of the biocatalytic and/or anti-icing molecules into a surface coating material; and/or
IV) producing fusion proteins.

In an embodiment, step I) comprises the step a) having the following order of steps:
a1) coating a surface with the surface coating material and, then,
a2) introducing the biocatalytic and/or anti-icing molecules into the surface coating material adhered on the surface.

In an embodiment, step I) comprises the step b):
b) coating a surface with the surface coating material wherein the biocatalytic and/or anti-icing molecules are provided similarly with the coating.

In an embodiment of the method, at least one of the steps I) and II) comprises step:
c) immobilising the biocatalytic and/or anti-icing molecules on particles made of a carrier material and introducing the particles with the immobilized biocatalytic and/or anti-icing molecules into the surface coating material.

In an embodiment of the method, at least one of the steps I) and II) comprises step:
d) immobilising the biocatalytic and/or anti-icing molecules on molecules or particles of a carrier material forming the surface coating material.

In an embodiment, the carrier material is selected from materials of the group consisting of:
porous materials,
silicates, preferably mesoporous silicates, especially MCM-41, SBA-15, FDU-5, SBA-16, FDU-23,
zeolithe,
carbon, preferably porous carbon,
glass, preferably porous glass,
a matrix material of a lacquer,
gold, especially gold nanoparticles and/or colloidal gold,
micro capsules, especially micro capsules made from a membrane for embedding the biocatalytic and/or anti-icing molecules,
polyvinyl beads or dextran beads,
fibre materials
aluminium, especially porous aluminium membranes,
hydro gels, and
mixtures of at least two or more of the aforementioned materials.

In an embodiment of the method according to the invention, step II) comprises the step:
e) providing a multi-layer assembly by deposing a first layer having the biocatalytic and/or anti-icing molecules and covering the first layer with at least one second layer having the biocatalytic and/or anti-icing molecules.

In an embodiment of the method according to the invention, step II) comprises the step:
f) immobilizing the biocatalytic and/or anti-icing molecules on dendrimer structures.

In an embodiment of the method according to the invention, step II) comprises the step:
g) immobilizing the biocatalytic and/or anti-icing molecules on porous aluminium membranes.

In an embodiment of the method according to the invention, step II) comprises the step:
h) immobilizing the biocatalytic and/or anti-icing molecules on a hydro gel.

In an embodiment of the method according to the invention, step III) comprises the step:

i) providing the surface coating material with micro-channels and/or micro-pores containing a liquid carrying the biocatalytic and/or anti-icing molecules.

In an embodiment of the method according to the invention, step III) comprises the step:

j) transporting a liquid carrying the biocatalytic and/or anti-icing molecules through micro-channels and/or micro-pores provided in a surface coating material from an inner region to an outer surface.

In an embodiment, the transport of the liquid is conducted by capillary action or via micro a pump.

In an embodiment, the step IV) comprises the step:

k) combining different biocatalytic and/or anti-icing molecules to form combined single molecules.

In an embodiment, the step IV) comprises the step:

l) combining the biocatalytic and/or anti-icing molecule with a tag promoting an immobilization or enabling a defined immobilization.

Of course, any combinations of all aforementioned embodiments of the invention are possible. Further embodiments of the invention are achieved by a combination of features of the aforementioned embodiments with any of the features as disclosed or claimed in the unpublished UK patent application GB 0808350.3 filed on 9 May 2008 by AIRBUS UK LIMITED, corresponding PCT/GB2009/050425 filed Apr. 28, 2009 and published on Nov. 12, 2009 as WO2009/136186 and corresponding U.S. National Phase application serial number 12/736,486 filed Oct. 13, 2010 and published as U.S. Publication 2011/0039066 on Feb. 17, 2011 and all of which are incorporated herein by reference.

In the following, embodiments of the invention are explained with reference to the accompanying drawings.

In the following, several embodiments of a surface structure with a coating for providing biocatalytic and/or anti-icing surfaces are presented. Details of the structure and the function of the biocatalytic surfaces have been described in the previous unpublished UK patent application GB 0808350.3 filed on 9 May 2008 by AIRBUS UK LIMITED and incorporated herein by reference. A copy of the original filed documents are enclosed to this application and form part of the description and part of the disclosure of this application. The coatings, surfaces and objects described in the following are improvements of the coatings, surfaces and objects as disclosed in this previous application.

In this previous application, several surfaces at least partly covered by biocatalytic and/or anti-icing molecules are described and shown.

Biocatalytic surfaces loose their activity when the active molecules immobilized on the surfaces are removed by erosion. According to one embodiment, a surface coating is proposed wherein biocatalytic active molecules are not only immobilized on the outermost surface but also applied in a certain depth below the surface. Thus, biocatalytic active and/or anti-icing active molecules are present within a covering layer of a certain thickness. Thus, if the outermost region of the surface with the attached active molecules is eroded, the molecules present within a deeper region are exposed and ensure the biocatalytic and/or anti-icing function. Hence, the corresponding surface remains biocatalytically active in spite of the erosion.

According to one embodiment, the functional coating is designed with a self-similar structure in deeper portions of the coating. Thus, while the outermost layer of the coating is subject to inevitable erosion, the structure and functional characteristics of the new surface remains the same as before.

These characteristics can relate to the activity of enclosed enzymes. However, the functional characteristics can also include further properties promoting or enabling the functionality of the layer such as a distributed supply of water (humidity) by several means.

In the following, different ideas to achieve self-regenerating biocatalytic and/or active anti-icing surface structures, especially, but not exclusively surface structures with coatings are described. The surface structure and/or coating can be achieved by different variants:

I) Introduction of enzymes into deeper layers of the surface coatings by different methods;

II) Increasing the density of enzymes; providing a tree-like or self-similar structure of the enzymes immobilized in a certain depth of the coating;

III) Introduction of µ-channels or µ-pores for the transport and/or storage of non-linked enzymes; or IV) Production of fusion proteins.

For simplicity, the following description refers to biocatalytic active proteins only as "enzymes". However, the same techniques also apply to any other substance suitable for the decomposition of organic or inorganic materials, especially to other biocatalytic active molecules and anti-icing molecules, more especially to biocatalytic and/or anti-icing proteins. For example, the molecules could also be ribozymes.

Figure 1:
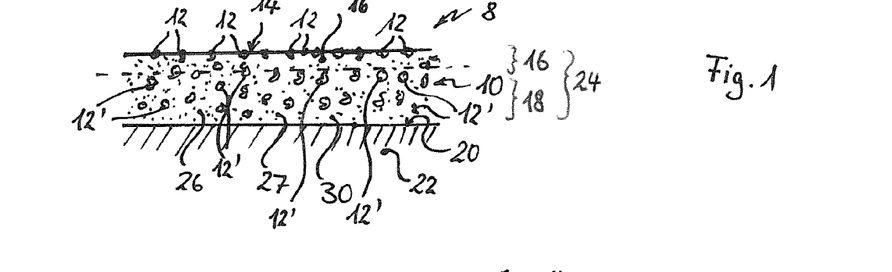
FIG. 1 shows a schematic of a first embodiment of a surface structure with a coating made of a carrier material carrying biocatalytic active and/or anti-icing active molecules.

I) Introduction of Enzymes into Deeper Layers of the Surface Coatings:

FIG. 1 shows a schematic sectional view of a surface structure 8 with a surface coating 10 having enzyme molecules 12 on a outer surface 14 of an outer layer 16 and enzyme molecules 12' within a deeper portion 18 or inner layer of the coating 10. The coating 10 is covering an object surface 20 of an object 22 being exposed to environmental conditions such as weather conditions leading to surface erosion.

Figure 2:
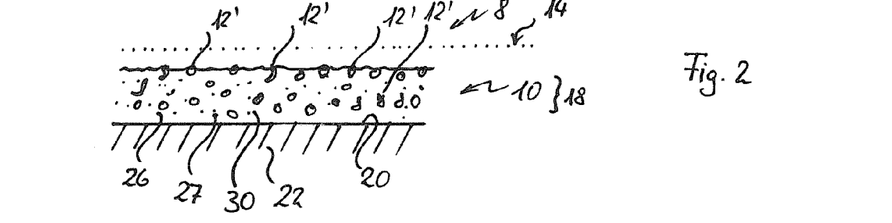
FIG. 2 shows a view similar to FIG. 1 showing the surface structure of the first embodiment in an eroded state.

FIG. 2 shows the same surface coating 10 as shown in FIG. 1, however, in a condition after erosion. When the outer layer 16 of the coating 10 is removed by erosion, fresh enzyme molecules 12' are becoming free and exposed on the surface.

A method for producing such coating 10 includes the step of providing biocatalytic active molecules 12, 12' not only on the outermost surface 14 but also within a certain depth below the surface 14, e.g. within a covering layer 24 having a certain thickness so that the corresponding surface 14 remains biocatalytic active even when the outermost layer 16 is eroded. This may include at least one of the following steps:

coating the object surface 20 with a surface coating material 26 and, then, introducing the biocatalytic active molecules—e.g. enzyme molecules 12, 12'—into the surface coating material 26 adhered on the object surface 20 and/or coating the object surface 20 with the surface coating material 26 wherein the biocatalytic and/or anti-icing molecules—e.g. enzyme molecules 12, 12'—are provided similarly with the coating.

In the following, several variants to achieve the aforementioned coating 10 are described in more detail with reference to FIGS. 1 and 3.

In FIG. 1, the enzyme molecules 12, 12' are contained in a carrier material 27 which is used as the coating material 26 itself.

Figure 3:
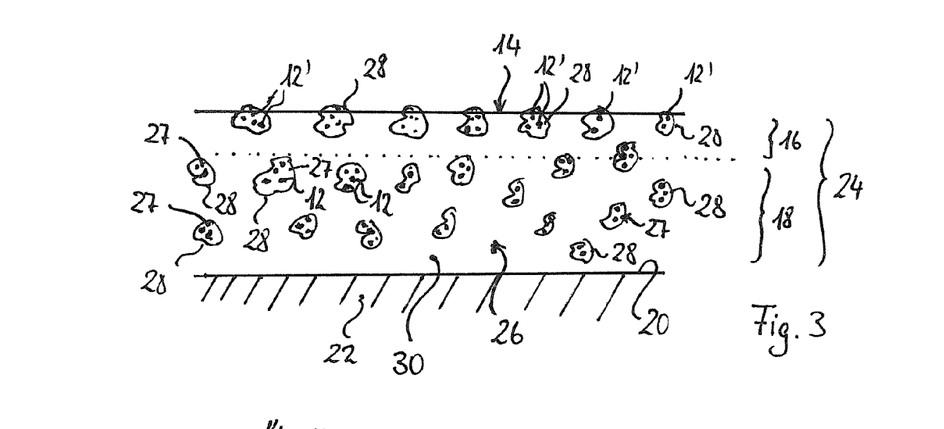
FIG. 3 shows a schematic sectional view of a second embodiment of a surface structure having a coating made of coating material containing particles made of a carrier material carrying biocatalytic and/or anti-icing molecules.

FIG. 3 shows a more detailed schematic drawing of a further embodiment of the coating 10. Particles 28 are embedded and contained within the coating 10, also in a certain depth. In other words, the particles 28 are embedded or contained in the coating material that may be a lacquer 30 or any other suitable coating material. The enzyme molecules 12, 12' are adhered on the particles 28 or contained in such particles. The particles 28 are made of a certain carrier material 27.

The coatings 10 as shown in FIG. 1 or 3 can be achieved by at least one of the following steps I.a) to I.h). The steps I.a) to I.h) mainly differ in the use of different carrier materials 27.

I.a) Immobilizing Proteins in Structures Made of Mesoporous Silicates:

According to one embodiment of the coating 10, the carrier material 27 is mesoporous silicate. In a concrete example, the proteins—e.g. the enzyme molecules 12, 12'—are introduced in structures made of mesoporous silicates and the structures are introduced into the coating material 26 that may be a lacquer 30, for example. The structure may be present as nanoparticle as represented by the particles 28 of FIG. 3.

Examples for such mesoporous silicates include for example MCM-41, SBA-15, FDU-5, SBA-16, and FDU-12. The materials may have pore sizes of 2 to 5 nm, 5 to 10 nm, 5 to 8 nm, 1 to 6 nm, or 4 to 9 nm.

For further details of such materials, reference is made to the following literature, incorporated herein by reference:

Yiu, H. H. P & Wright, P. A., 2005, Enzymes supported on ordered mesoporous solids. J. Mater. Chem. 15, 3690-3700.

Diaz, J. F., Kenneth, J. B., 1996, Enzyme immobilization in MCM-4 1 molecular sieve. Journal of Molecular Catalysis B: Enzymatic, 2, 115-126.

J. M. Kisler, G. W. Stevens, A. J. O'Connor, 2001, Adsorption of proteins on mesoporous molecular sieves. Mater. Phys. Mech. 4, 89-93.

A. S. Maria Chong, X. S. Zhao, 2004, Design of large-pore mesoporous materials for immobilization of penicillin G acylase biocatalyst. Catalysis Today 93-95, 293-299.

A. S. Maria Chong, X. S. Zhao, 2004, Functionalized nanoporous silicas for the immobilization of penicillin acylase, Applied Surface Science 237, 398-404.

I.b) Immobilizing Proteins on or in Zeolithe.

According to a further embodiment, the carrier material 27 is zeolithe. The proteins—e.g. enzyme molecules 12, 12'—are immobilized on the zeolithe. According to one example, the particles 28 as shown in FIG. 3 may be zeolithe particles containing the enzyme molecules 12, 12'. According to another example, the coating material 26 is made of the zeolithe material. This method may be limited in use to very small enzymes.

For further details of the immobilization to zeolithe, reference is made to the following literature, incorporated herein by reference:

Gonçalves, A. P. V., Lopes, J. M., Lemos, F., Ramôa Ribeiro, F., Prazeres, D. M. F., Cabral, J. M. S., Aires-Barros, M. R. (1996). Zeolithes as supports for enzymatic hydrolysis reactions. Comparative study of several zeolithes. Journal of Molecular Catalysis B: Enzymatic, 1, 53-60.

C. Rocha, L. Ducso, M. P. Gongalves, J. A. Teixeira, SPENT-GRAINS AND ZEOLITES AS POTENTIAL CARRIERS FOR TRYPSIN IMMOBILISATION; Abstract $2^{nd}$ Mercosur Congress on Chemical Engineering.

I.c) Immobilizing of Enzymes on Porous Carbon:

According to another embodiment, the carrier material 27 is porous carbon. Hence, the coating material 26 of FIG. 1 can be porous carbon, or the particles 28 as shown in FIG. 3 may be made of porous carbon.

I.d) Immobilizing of Enzymes on Porous Glass:

According to another embodiment, the carrier material 27 is porous glass. Hence, the coating material 26 of FIG. 1 can be porous glass, or the particles 28 as shown in FIG. 3 may be made of porous glass.

I.e) Coupling of the Enzymes to a Lacquer Matrix:

According to another embodiment, the carrier material 27 used as the coating material 26 of FIG. 1 is a lacquer 30. One example for a suitable lacquer is a lacquer on basis of polyurethane.

The enzyme molecules 12, 12' are coupled directly to the polyurethane matrix of the lacquer. This can be done by simply mixing the lacquer 30 with an enzyme liquid containing the enzyme molecules 12, 12' before the lacquer 30 is applied to the object surface 20.

I.f) Coupling the Enzymes to Gold Nanoparticles:

According to a further embodiment, the carrier material 27 of the particles 28 as represented in FIG. 3 is gold. In an example, the enzyme molecules 12, 12' are coupled to nanoparticles 28 made of gold (colloidal gold). The gold nanoparticles are introduced into the coating material 26.

Figure 4:
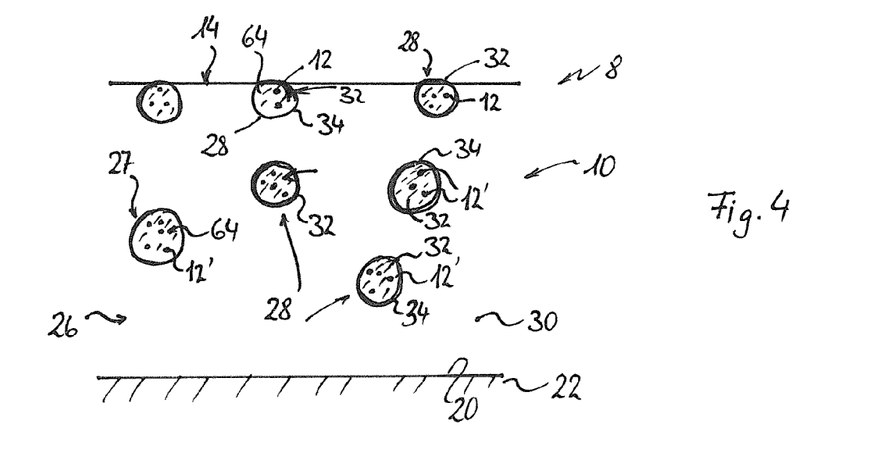
FIG. 4 shows a schematic sectional view of a third embodiment of the surface structure similar to the second embodiment with a variant of the particles.

I.g) Embedding of the Enzymes into Micro Capsules:

FIG. 4 shows a further detail of a special variant of the embodiment of the coating 10 as shown in FIG. 3. FIG. 4 shows a special form of the particles 28 in more detail. According to this variant, the particles 28 are micro capsules 32 enclosing the enzyme molecules 28: This can be done by enclosing a small volume of an enzyme liquid 64.

Hence, according to this embodiment, the enzymes are embedded in micro capsules 32. The capsules 32 can be made of membranes 34. The micro capsules 32 can be introduced as particles 28 into the coating material 26.

A special variant of this micro capsules 32 is the use of polyvinyl beads or dextran beads. According to this variant, the enzymes are embedded in polyvinyl beads or dextran beads. These beads form the particles 28 that are introduced into the coating material 26.

Figure 5:
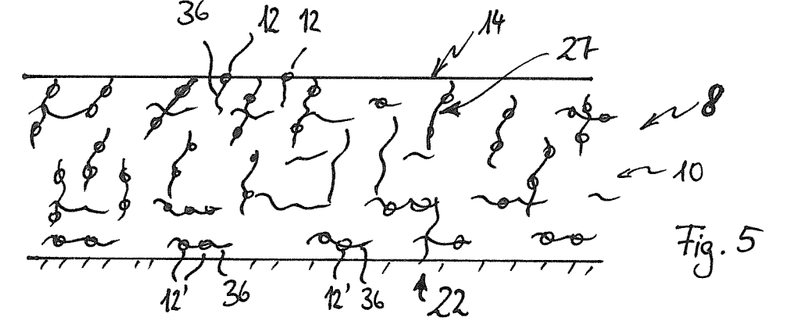
FIG. 5 shows a schematic sectional view of a fourth embodiment of the surface structure, wherein fibre material is used as the carrier material for the biocatalytic active and/or anti-icing molecules.

I.h) Embedding the Enzymes in Fibre Materials:

FIG. 5 shows a further detail of a further variant of the embodiment of the coating 10 as shown in FIG. 3. FIG. 5 shows another form of the particles 28 in more detail. According to this variant, the particles 28 are fibres 36 enclosing the enzyme molecules 28. Hence, the carrier material 27 employed here is a fibre material.

The fibre materials containing the enzyme molecules can be introduced into other structures.

For example, the fibre materials can be used as fibres in composite materials such as carbon fibres reinforced materials. In a concrete example, fibres to be used for reinforcing a material of the object are soaked in enzyme liquid and then embedded in a plastic matrix.

II) Increasing the Density and/or Activity of the Enzymes:

In the following further embodiments of a method for producing self-regenerating biocatalytic active surfaces and/or coatings are described wherein a step of increasing the density or the activity of the enzymes is employed.

This may be done employing any of to the following steps II.a) to II.c)

II.a) Multi Layer Assembly

Figure 6:
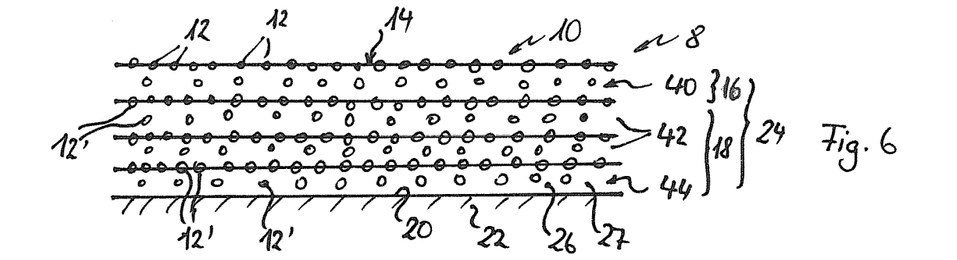
FIG. 6 shows a schematic sectional view of a fifth embodiment of the surface structure having a coating made of several layers deposed in a stacked order.

FIG. 6 shows a further embodiment of the coating 10 having enzyme molecules 12 on its surface and enzyme molecules 12' embedded therein, wherein the coating 10 is formed by several layers 40, 42, 44. A plurality of the layers 40, 42, 44 includes immobilized enzyme molecules 12, 12'. The coating 10 is produced by consecutive deposition of the layers 40, 42, 44. First, a basic layer 44 is deposited on the object surface 20 wherein enzyme molecules 12' are immobilized thereon. Then, one ore several inner layers 42 are deposited on the surface of the basis layer 44 wherein enzyme molecules 12' are immobilized on the inner layer(s) 42. Then, an outer layer 40 is deposited on the surface of the last inner layer 42 wherein enzyme molecules 12 are immobilized on the outer layer 40.

All the layers 40, 42, 44 have a similar structure. Thus, self-similar structures are present at the outer surface 14 and are repeated in deeper regions of the coating 10.

According to this embodiment, a multilayer assembly 38 is provided by means of layer by layer deposition. Especially, polyelectrolyte multilayers are provided. For further details, reference is made to the following literature, incorporated herein by reference:

Yun Liu, Wei Zhong, Sheng Meng, Jilie Kong, Haojie Lu, Pengyuan Yang, Hubert H. Girault, Baohong Liu, 2006, Assembly-Controlled Biocompatible Interface on a Microchip. Chem. Eur. J. 12, 6585-6591.

Figure 7:
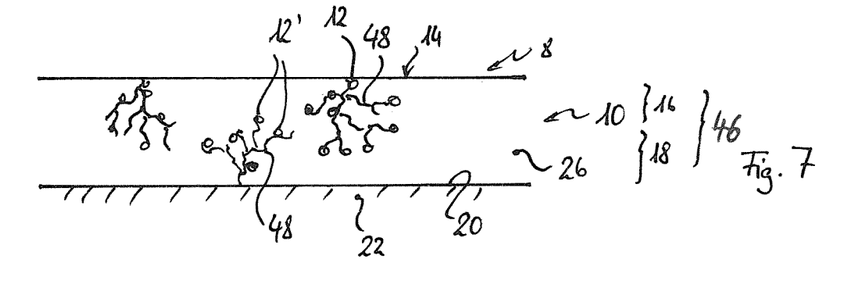
FIG. 7 shows a schematic sectional view of a sixth embodiment of the surface structure having a coating with dendrimer structures and biocatalytic molecules immobilized thereon.

II.b) Immobilizing the Enzymes on Dendrimer Structures:

FIG. 7 shows a schematic sectional view of a further embodiment of the coating 10 wherein the enzyme molecules 12, 12' are immobilized on tree-like structures 48. This embodiment of the coating 10 is provided by immobilizing the enzyme molecules 12, 12' on tree-like branched structures that are embedded in a surface layer 46 having a certain thickness. This branched structure ensures that enzymes are present over the whole thickness of the surface layer 46.

Examples of suitable tree-like structures 48 include the so called dendrimer structures.

For further details, reference is made to the following literature, incorporated herein by reference:

Neeraj Kohli, Petar R. Dvornic, Steven N. Kaganove, Robert M. Worden, Ilsoon Lee, 2004, Nanostructured Crosslinkable Micropatterns by Amphiphilic Dendrimer Stamping. Macromol. Rapid Commun. 25, 935-941.

Benters, R.; Wöhrle, D.; Niemeyer, C. M., 2001, Dendrimer-aktivierte Chipmatrix für die Herstellung von Nuklein-säure-und Protein-Microarrays. Abstract 2. Biosensor-Symposium, Tübingen.

V. Le Berre, E. Trevisiol, A. Dagkessamanskaia, S. Sokol, A. Caminade, J. Majoral, B. Meunier, J. Francois, 2003, Dendrimeric coating of glass slides for sensitive DNA microarrays analysis. Nucleic Acids Research, Vol. 31, No. 16.

Figure 8:
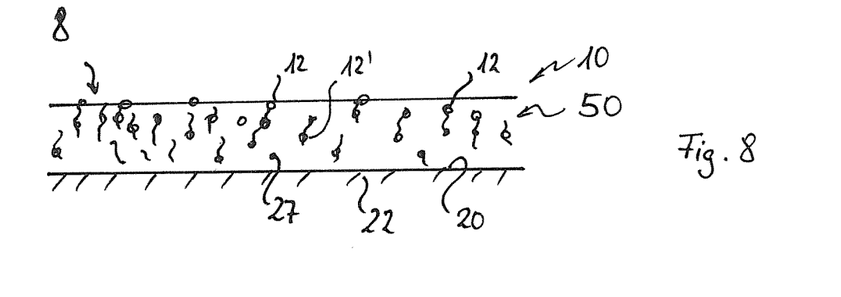
FIG. 8 shows a schematic sectional view of a seventh embodiment of the surface structure wherein a coating is made of a porous aluminium membrane used as a carrier material for the biocatalytic molecules.

II.c) Immobilizing Enzymes on Porous Aluminium Membranes:

One further possible procedure to increase the density of the biocatalytic active molecules includes immobilizing the enzymes in or on porous aluminium membranes. Such aluminium membranes can be used as carrier material 27 in one of the embodiments as shown in FIG. 1 or 3. Another variant is shown in FIG. 8 representing the object 22 having its object surface 20 covered by a porous aluminium membrane 50 containing the enzyme molecules 12, 12'.

For further details, reference is made to the following literature, incorporated herein by reference:

V. Smuleac, D. A. Butterfield, S. K. Sikdar, R. S. Varma, D. Bhattacharyya, 2005, Polythiol-functionalized alumina membranes for mercury capture. Journal of Membrane Science 25, 169-178.

II.d) Immobilizing of Enzymes in Hydrogels:

A hydrogel (also called Aquagel) is a network of polymer chains that are water-insoluble, sometimes found as a colloidal gel in which water is the dispersion medium. Hydrogels are super absorbent (they can contain over 99% water) natural or synthetic polymers. Hydrogels also possess a degree of flexibility very similar to natural tissue, due to their significant water content.

Hydrogels are, for examples, used in contact lenses (silicone hydrogels, poly-acrylamides).

Common ingredients are e.g. polyvinyl alcohol, sodium polyacrylate, acrylate polymers and copolymers with an abundance of hydrophilic groups.

Figure 9:
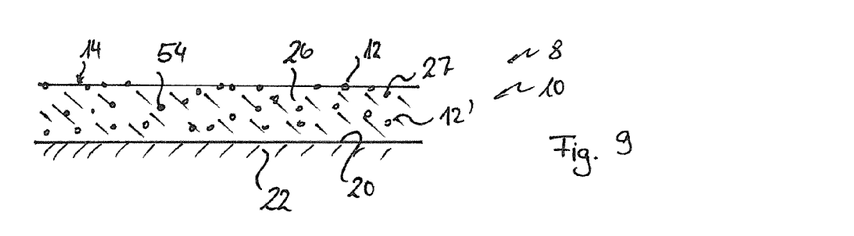
FIG. 9 shows a schematic sectional view of an eighth embodiment of the surface structure having a coating made of hydrogel used as carrier material for the biocatalytic molecules.

FIG. 9 shows a further embodiment of the coating 10, similar to the embodiment of FIG. 3, wherein the carrier material 27 used as coating material 26 and containing the enzyme molecules 12, 12' is a hydrogel 54.

Figure 10:
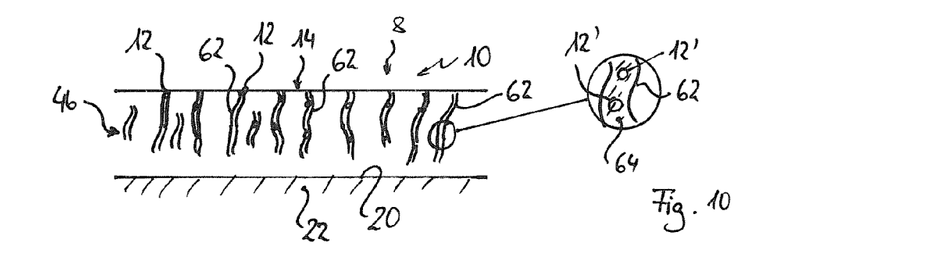
FIG. 10 shows a schematic sectional view of a ninth embodiment of the surface structure having a coating or outer surface layer with µ-pores or µ-channels containing a liquid carrier material for the biocatalytic and/or anti-icing molecules.
Figure 11:
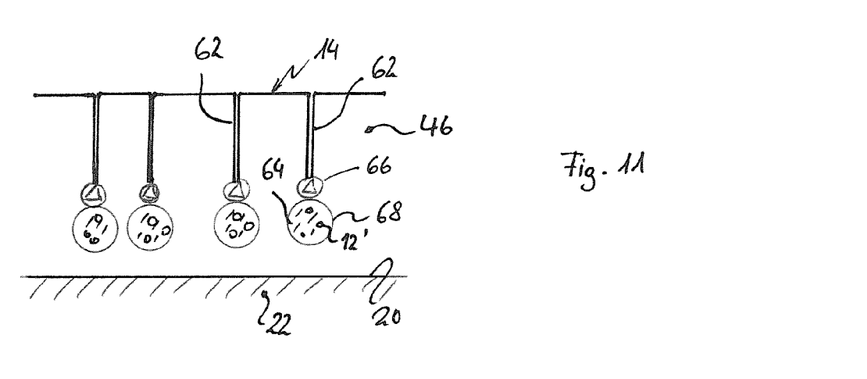
FIG. 11 shows a schematic sectional view of a tenth embodiment of the surface structure that is a variant of the ninth embodiment wherein the surface structure according to the tenth embodiment additionally comprises micro pumps and further reservoirs.

III) Applying a Liquid Enzyme Cocktail Via Micro Channels or Micro Pores:

FIGS. 10 and 11 show two further embodiments of the coating 10. In both embodiments according to FIGS. 10 and 11, the coating 10 has the surface layer 46. In this embodiments, the surface layer 46 includes μ-channels 62. The μ-channels 62 contain an enzyme liquid 64 having the enzyme molecules 12, 12'.

The enzymes are not immobilized but are present in a liquid form. When the enzymes are removed from the outer surface 14, for example by erosion, further enzymes are supplied from below. The transport of the enzyme liquid 64 may be conducted similar to a liquid transport in plants. The viscosity and further parameters (for example size of the μ-channels 62) are set in such way that there are no essential losses of molecules due to evaporation.

FIGS. 10 and 11 show possible embodiments, wherein the coating 10 of FIG. 10 just uses a capillary action for the transport of the enzyme liquid 64 while, in the embodiment of FIG. 11, micro pumps 66 are employed for the transport of the enzyme liquid 64. As indicated in FIG. 11, further reservoirs 68 for enzyme liquid 64 may be provided in a deeper portion of the surface layer.

IV) Producing of Fusion Proteins:

Further embodiments (not shown) include the production of fusion proteins. Especially, the following variants are possible:

IV.a) Different enzymes are combined in one single molecule.

IV.b) At least one enzyme and at least one anti-icing protein are combined in one single molecule.

IV.c) At least one enzyme is combined with a tag enhancing or promoting the immobilization or enabling a more selective or more specific immobilization.

Figure 12:
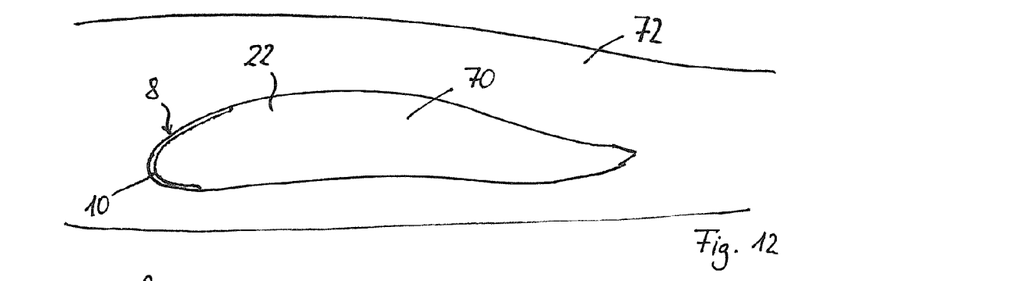
FIG. 12 shows a part of a wing of an aircraft as example for an object having an aerodynamically or hydrodynamically active surface employing the surface structure according to one of the first to tenth embodiments.

V) Possible Uses:

The object 22 can be of different kinds. Especially, the object 22 may be an aircraft, for example and aeroplane or a rotorcraft, or a part thereof, for example a wing part. FIG. 12 shows a wing part 70 of an aircraft 72 as one example for the object 22 wherein the object surface 20 is an aero- or hydrodynamically active surface.

Figure 13:
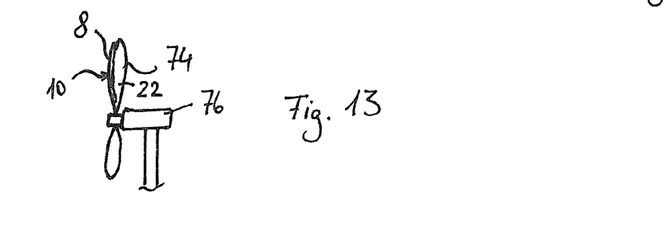
FIG. 13 shows a rotor of a wind turbine as further example for such object.

Further, the self-cleaning and self-regenerating surface structure and/or the coating 10 as presented herein can be used in a rotor 74 of a wind turbine 76, as indicated in FIG. 13. The biocatalytic effect of the surface structure as described above is especially suitable for such rotors, as there is a quite large problem of deterioration of the efficiency of such rotors by organic pollution; please see the following literature, incorporated herein by reference:

G. P. Corten, H. F. Veldkamp, 2001, Insects can halve wind-turbine power. Nature, Vol 412-5., 42-43.

Further, the environment conditions in the vicinity of wind rotors 74 are much easier to handle as, for examples, the environmental conditions in which an aircraft is moved.

The surface structures as presented herein can also be used in all further technical fields where surfaces are to be cleaned and are subject to rough environmental conditions as well as erosion. For example, the object 22 can be a vehicle, a building, a construction, an object to be used in households, for example a furniture, or an industrial product.

LIST OF REFERENCE SIGNS

8 surface structure
10 coating
12 enzyme molecules (exposed)
12' enzyme molecules (embedded)
14 outer surface (exposed surface)
16 outer layer (outermost layer)
18 deeper portion (below an exposed surface)
20 object surface
22 object
24 covering layer
26 coating material
27 carrier material
28 particle
30 lacquer
32 micro capsule
34 membrane
36 fibre
38 multilayer assembly
40 outer layer
42 inner layer
44 basic layer
46 surface layer
48 tree-like structure
50 aluminium membrane
54 hydrogel
60 covering layer
62 μ-channel
64 enzyme liquid
66 micro pumps
68 reservoir
70 wing part
72 aircraft
74 rotor
76 wind turbine

The invention claimed is:

1. A self-regenerating surface structure comprising at least one of molecules from the group consisting of biocatalytic molecules and anti-icing molecules, said at least one of said molecules located on an exposed surface of said surface structure and at least one of said molecules from said group are embedded or contained in said surface structure so as to form a self-regenerating surface structure.

2. The surface structure according to claim 1, wherein the molecules from the group are contained in an inner layer beneath the surface.

3. The surface structure according to claim 2, wherein an outer layer covers at least one inner layer and both said layers contain molecules from the group.

4. The surface structure according to claim 1, wherein the molecules from the group are at least one of adhered to or contained in a carrier material.

5. The surface structure according to claim 4, wherein the carrier material is present in form of particles embedded in a surface material or coating material or is present as surface material or coating material itself.

6. The surface structure according to claim 5, wherein the carrier material has at least one of inner channels and cavities containing the molecules from the group.

7. The surface structure according to claim 1, wherein the structure comprises at least one of μ-channels and μ-pores for at least one of a transport or a storage of non-linked molecules from the group.

8. The surface structure according to claim 1, wherein the structure comprises a plurality of layers comprising the molecules from the group, said plurality of layers provided by layer-by-layer deposition.

9. The surface structure according to claim 1, wherein said structure comprises a tree-like structure of the molecules from the group, said tree-like structure immobilized to a depth of the surface structure.

10. The surface structure according to claim 1, wherein said structure includes fusion proteins.

11. An object having said surface structure according to claim 1.

12. A method for providing a self-regenerating surface structure comprising the steps of:

providing molecules from a group consisting of biocatalytic and anti-icing molecules on said surface structure; and providing molecules from the group embedded or contained in said surface structure.

13. The method according to claim 12, including the step of introducing molecules from the group into an inner layer of a surface coating material or surface forming material.

14. The method according to claim 12, including the step of increasing density of molecules from said group in a surface coating material or surface forming material.

15. The method according to claim 12, including the step of providing a tree-like structure of the molecules from the group within a surface coating material or surface forming material.

16. The method according to claim 12, including the step of providing at least one of micro-channels and micro-pores for at least one of transport and storage of the molecules from the group in a surface coating material or surface forming material.

17. The method according to claim 12, including the step of providing said surface with fusion proteins.

18. The method according to claim 12, comprises at least one of the following steps:

immobilising the molecules from the group on particles made of a carrier material and introducing the particles into the surface coating material or surface forming material; and immobilising the molecules from the group on molecules or particles of said carrier material forming the surface coating material or the surface forming material.

19. The method according claim 14, including the step of providing a multi-layer assembly by deposing a first layer having the molecules from the group and covering the first layer with at least one second layer also having molecules from the group.

20. The method according to claim 14, including at least one of the following steps:

providing the surface coating material or surface forming material with at least one of micro-channels and micro-pores containing a liquid carrying the molecules from the group;

transporting a liquid carrying the molecules from the through at least one of micro-channels and micro-pores provided in a surface coating material or a surface forming material from an inner region to an outer surface by capillary action or via micro pumps;

combining different molecules from the group to form combined single molecules; and combining the molecules from the group with a tag promoting an immobilization or enabling a defined immobilization.

21. The surface structure according to claim 1, wherein the surface structure is a coating.

* * * * *